G. BARKER.
DRIVING GEAR OF THE FRICTION TYPE.
APPLICATION FILED MAR. 10, 1920.
1,363,831. Patented Dec. 28, 1920.
2 SHEETS—SHEET 2.
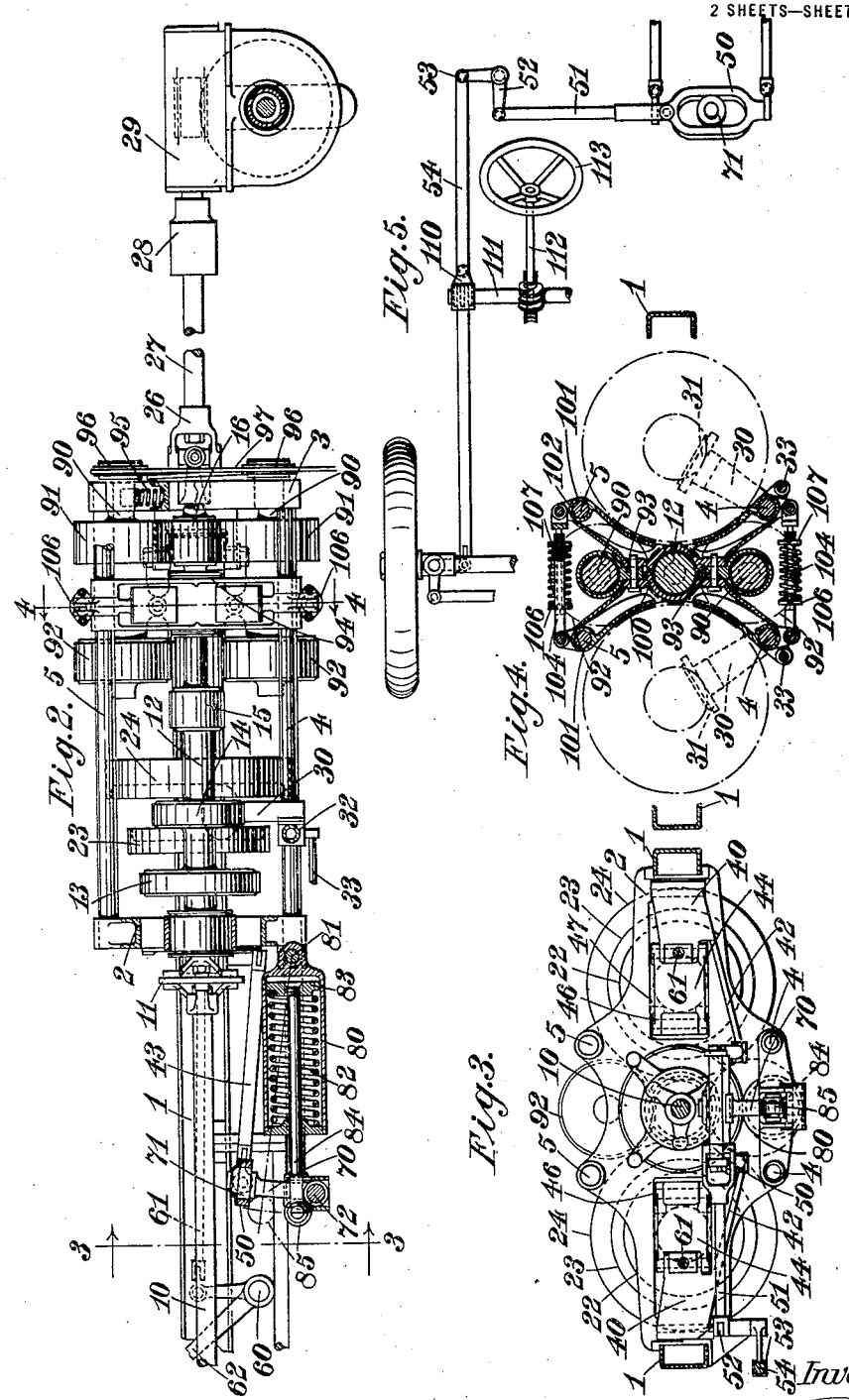
Inventor
Gerald Barker

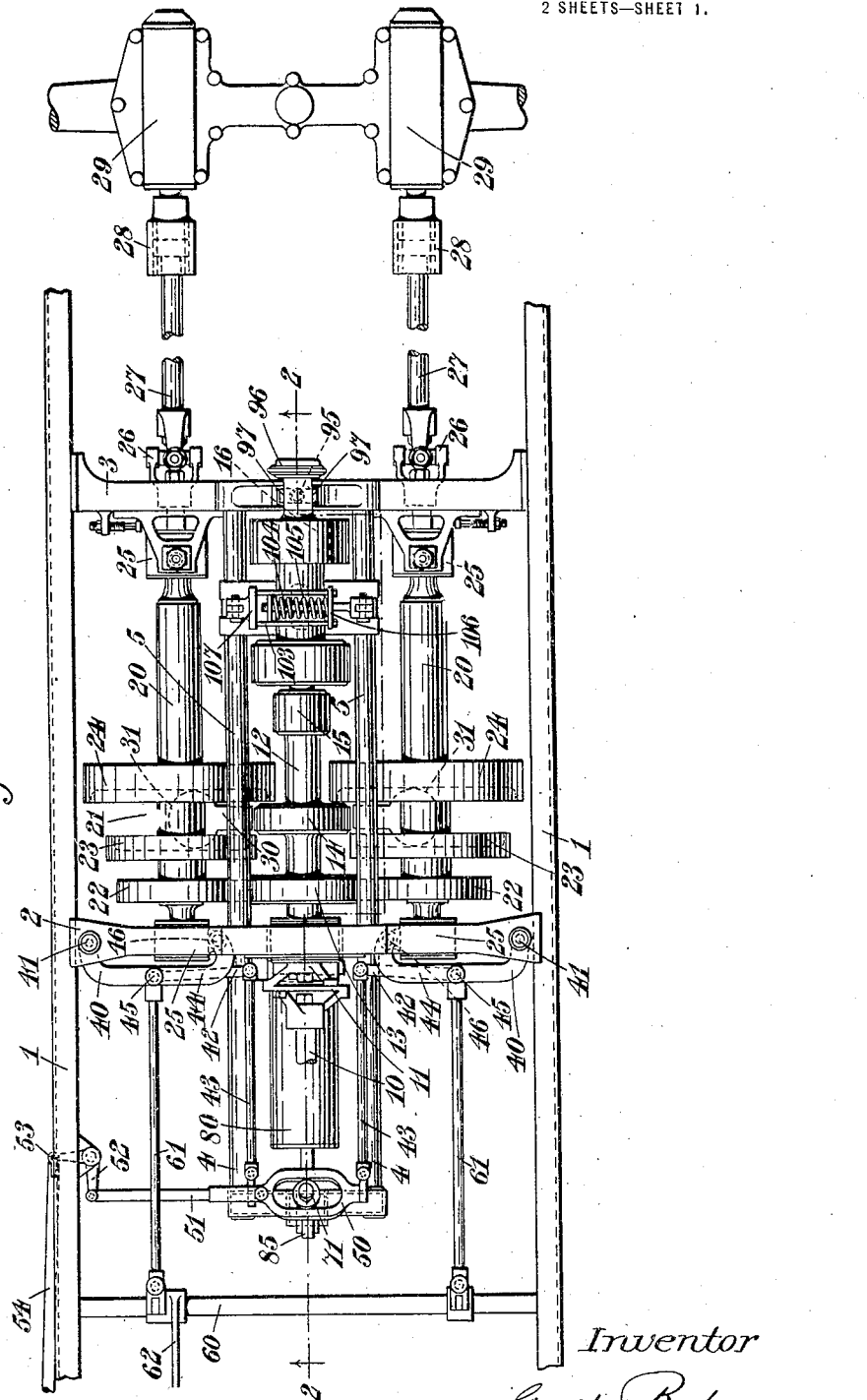

UNITED STATES PATENT OFFICE.

GERALD BARKER, OF LONDON, ENGLAND.

DRIVING-GEAR OF THE FRICTION TYPE.

1,363,831.  Specification of Letters Patent.  Patented Dec. 28, 1920.

Application filed March 10, 1920. Serial No. 364,627.

*To all whom it may concern:*

Be it known that I, GERALD BARKER, a subject of the King of England, residing in London, in England, have invented certain new and useful Improvements in Driving-Gear of the Friction Type, of which the following is a specification.

This invention relates to driving gear of the friction-type having a single driving-shaft, two laterally movable driven-shafts and means for applying lateral thrusts to the driven-shafts for the purpose of effecting frictional engagement between gear-elements formed on or carried on the driving- and driven-shafts.

One of the objects of the present invention is to provide means whereby the two driven-shafts may be controlled so that either of them may be made to slip more than its fellow as desired. As is well-known, friction-gear requires that the engaging gears shall be thrust together, and for this purpose the driven-shafts are made movable laterally and coöperate with means for applying the requisite thrust.

According to the present invention, a power-transmission gear of the type specified is characterized by a yoke having its opposite ends operatively connected respectively one to each of the driven-shafts in such a manner as to thrust the latter toward the driving-shaft when pressure is applied to the yoke, and means to modify the relative values of the thrusts imparted to the said driven-shafts whereby either one of them may, at will, be thrust with greater force than its companion against the driving-shaft.

Preferably the yoke is formed with a slot extending in a direction between its two opposite ends aforesaid, and coöperates with pressure-applying means having an operative portion engaging within the slot, and means are provided to move the yoke in relation to the said operative portion of the pressure-applying means to vary the point of contact of the latter with the yoke.

In one form of the invention the thrust is transmitted from the pressure-applying device to the yoke through a variable leverage so that the total thrust applied to the yoke is made variable.

According to another feature of the invention the construction is characterized by toggle-linkage operatively connected with the yoke for moving laterally each of the driven-shafts, an arm of each toggle being extended toward the driving-shaft and toward one another, whereby the operative connections of the yoke to the toggles are compactly arranged.

According to a further feature of the invention, the yoke is movable transversely of the line of action of its thrust and is operatively connected to the driven-shafts by relatively long rods, whereby the effect of the obliquity of thrust obtained in certain positions of the yoke is rendered negligible.

According to another feature of the invention, the above-described controlling means for friction-drive power-transmission gear may be employed on a self-propelled vehicle having an operative connection between the steering gear and said means for applying pressure to the yoke, whereby the point of application of the said pressure on the yoke is moved by the steering movements of the steering gear. The connection is such that one or other of the driven-shafts is allowed to slip, as the vehicle turns to the right or to the left, and if the driven-shafts are allocated one to each road-wheel, the necessity for other differential gear on the vehicle is avoided, since, by the present invention, the road-wheels will be driven at the required differential speeds.

The invention also includes the provision of brakes so disposed in relation to the driven-shafts that when their gear-members are brought to the free-engine position, a gear-member of each driven-shaft can, by a lateral movement of the latter, similar to a movement for bringing the shafts into frictional driving engagement with a gear-member on the driving-shaft, be brought into engagement with the brakes.

One preferred specific form of the invention will now be described in detail with the aid of the accompanying drawings, in which—

Figure 1 is a plan of the chassis of a vehicle with that part of the mechanism necessary for the understanding of the present invention illustrated in its position on the chassis;

Fig. 2 is a longitudinal section on the line 2—2 of Fig. 1;

Fig. 3 is an end view looking in the direction of the arrows from the position of the line 3 in Fig. 2;

Fig. 4 is a transverse section on the line 4—4 in Fig. 2, and

Fig. 5 is a plan view showing the connection of the friction-gear with the steering-gear.

Like reference numerals designate like parts throughout the several views.

The side members of the chassis frame are indicated by the reference numeral 1. A main power-shaft 10 coupled to the engine is connected by means of a flexible coupling 11 to a driving shaft 12. The driving-shaft carries gear-members 13, 14 and 15 secured to, or formed integrally with, it for forward drive and a gear-member 16 for reverse drive. The driving-shaft is carried in bearings borne respectively in a cross frame-member 2 and a bracket 94 hereinafter referred to, which bearings support the shaft at or near its two ends.

Driven-shafts 20 arranged one on either side of the driving-shaft 12, are each keyed to receive a sleeve 21 capable of sliding on the shafts 20 but, by means of the keys, are caused to rotate with the shafts. The sleeves 21 carry on them gear-members 22, 23 and 24 for peripheral frictional engagement with the gear-members 13, 14 and 15. The opposed faces of the gear-members 23 and 24 are dished to receive an anti-friction roller 31 carried at the extremity of a shifting arm 30 mounted to slide on guide-rails 4 carried in the cross frame-members 2 and 3. The arms 30 are both connected at their lower extremities, as by a cross-connector 32, Fig. 2, and by means of a rod 33 operatively connected with the part 32 and with a change speed lever (not illustrated) the arms 30 may be moved backward and forward in the length of the chassis. By their movement the sleeves 21 are moved along the shafts 20 to bring any selected gear-member 22, 23 or 24 into engagement with its coöperating gear-member 13, 14 or 15 respectively on the driving-shaft.

Near their rear ends the shafts 20 are mounted in swiveling bearings 25 supported in brackets from the cross frame-member 3 so that the shafts may be swung laterally toward or away from the driving-shaft 12. At their rear extremities the shafts 20 are connected by a Hooke's joint or other universal coupling 26 to tail-shafts 27 connected by means of a sliding muff-joint 28 with driving gear for the rear road-wheels. This driving gear is diagrammatically illustrated at 29 in Fig. 1.

Supported in the cross frame-member 2 is a toggle-mechanism for the forward end of each driven-shaft 20. Each toggle-mechanism comprises an arm 40 anchored to the frame 2 by a swiveled connection 41. Each of the arms 40 has an inwardly-projecting extension 42 which, at their inner ends, are pivotally connected to the rear ends of rods 43, in turn pivotally connected at their other ends to a yoke 50.

The other member 44 of each toggle-joint is pivotally connected at its end 45 to the arm 40, and at its other end is pivotally connected at 46 to a bearing 47 which supports the forward end of a shaft 20 and is arranged to slide in guideways in the cross-frame 2. This feature is clearly shown in Fig. 3. At the pivotal connections 45 between the arms 40 and 44 of each toggle-joint is connected in a pivotal manner a rod 61 connected through a suitable lever-connection to a rock-shaft 60. This rock-shaft 60 is moved by means of a de-clutching pedal-lever 62 so that the rods 61 may be pulled to the left of Fig. 1 in order to declutch the gear-members of the driven-shafts 20 from their coöperating gear-member on the shaft 12. It will be readily understood that a pull toward the left of Fig. 1 on the rod 61 will then "break" the toggle-joint 40, 44 and as the arm 40 is anchored at 41 the pivotal connection 46 of the arm 44 will be moved outwardly from the center-line of the vehicle, thus sliding the forward end of the shaft 20 in a direction away from the driving-shaft. This effects disengagement of the gear-members of the driven-shafts from the gear-members of the driving-shaft.

The yoke 50 is of slotted form, as clearly illustrated in Fig. 1, and is connected by a rod 51 to a bell-crank lever 52 pivotally connected at 53 to one end of a rod 54, the other end of which is connected with the steering mechanism. By this connection a steering movement to the right or to the left will move the rod 51 in one direction or the other transversely across the chassis.

Within the slot in the yoke 50 is located a roller 71 bearing at all times on the right inner surface of the slot and carried at the upper end of a swinging arm 70; see Fig. 2. The arm 70, at its lower end, is pivoted at 72 to a frame-member 73 borne by continuations of the guide-rails 4 so that it is capable of swinging in a fore and aft direction.

A cylindrical casing 80 pivoted in the cross frame-member 2 at 81, incloses a coiled compression-spring 82. One end of the spring 82 engages a sliding piston 83 connected with a rod 84 adapted to slide through a bearing in the forward cover of the cylinder 80. The rod 84, at its forward end, carries a roller 85 which can run on the front face of the swinging arm 70, and the tendency of the spring 82 is to move the piston 83 so as to pull the arm 70 in a rearward direction, that is to say to the right of Figs. 1 or 2. Thus, the spring 82 at all times applies a pressure by means of the roller 71 to the yoke 50 in a direction in which a thrust will be imparted through the rods 43 to the arms 42 of the toggle-levers 40 as will tend to straighten out the toggle-joint 40, 44 and move the forward ends of the shafts 20 toward the shaft 12. By reason of this thrust the gear-members on the shafts 20 are held in frictional driving engagement with a selected gear-member on the shaft 12, and by swinging the cylinder 80 about its pivot 81, the leverage with which the spring-pressure acts upon the arm 70, may be varied to impart a greater or lesser thrust to the rods 43. The mechanism for swinging the casing 80 about its pivot 81 is not illustrated for the sake of clearness and may be of any convenient construction.

It will be appreciated, moreover, that by the transverse movement of the yoke 50, that is a movement transverse to the direction of its thrust, the point of application of the pressure of the spring 82 on the yoke can be varied along the length of the yoke, as during the transverse movements of the latter the roller 71 remains stationary in space. By so varying the point of application of the pressure on the yoke, the degree of thrust imparted through the rods 43 to the toggle-mechanisms can be thrown out of balance, that is to say one or other of the toggle-mechanisms will receive a greater or lesser thrust than the other. From this it will follow that by suitably connecting the yoke 50 with the steering mechanism, a steering movement to the right or left can, by movement of the yoke in relation to the point of application of the pressure to it, cause a greater thrust to be imparted to that toggle-mechanism controlling the driven-shaft connected with the road-wheel taking the outer curve. Simultaneously it will reduce the pressure on the toggle-mechanism connected with the other driven-shaft to allow it to slip to a pre-rearranged degree according to the extent to which the turning movement is made and to which the yoke is in consequence moved in relation to the roller 71. The hereinbefore described mechanism, therefore, obviates the necessity of any other differential mechanism for the road-wheels connected with the driven-shafts.

Such an arrangement is shown in Fig. 5, in which the rod 54 is connected to a lever-arm 110 mounted on a rocking shaft 111 that is geared with the steering column 112 of the motor-driven vehicle, so that when the steering wheel 113 is turned in either direction for steering the vehicle, the yoke 50 will be shifted transversely of the vehicle in a corresponding direction to cause the thrust imparted to the driven shaft 20 that drives the road-wheel taking the inner curve, to have imparted to it a lesser thrust than is imparted to the other driven-shaft 20.

For the purpose of a reversal in the direction of the drive, two counter-shafts 90 are provided mounted respectively above and below the driving-shaft 12. Each of the counter-shafts 90 carries gear-members 91 and 92 and the shaft itself is carried in a bearing pivotally mounted at 93 (see Fig. 4) in a frame or bracket 94 carried on the guides 4 and other frame-members 5 above the driving-shaft. The members 4 and 5 are all borne in the cross-members 2 and 3. The bosses of pulleys 96 on the rear ends of the counter-shafts 90 are laterally supported in guides in the frame-member 3 and are capable of vertical sliding movement and are normally held, by means of springs 95, so that they are swung sufficiently far about the pivots 93 that the gear-members 91 are out of frictional engagement with the gear-member 16 on the driving-shaft 12. Cords 97 are led around the said grooved pulleys 96 from a control-lever, not shown, accessible to the driver of the vehicle, so that the pulleys may be drawn toward one another and to the driving-shaft when required, to cause engagement between the gear-members 91 and the gear-member 16. Naturally before engagement between the gear-members 92 and 24 takes place, the shafts 20 will have been swung laterally outwardly to disengage their friction-members from the coöperating members on the driving-shaft. By sliding the sleeves 21 sufficiently far, the gear-members 24 may be brought into a position of working relationship with the gear-members 92, into frictional engagement with which they may be moved in order to obtain a reversal in the direction of drive.

A still further movement to the right of the sleeves 21 would bring the gear-members carried by them into the free-engine position, and in order to obtain an auxiliary braking action for coasting purposes, the gear-members 24 may, by an inward lateral movement of the shaft, be swung into engagement with brake-shoes 100 pivotally supported in the frame 94. These brake-shoes are arranged in pairs above and below the center-line of the driving-shaft 12, as clearly illustrated in Fig. 4, and they are each provided with arms 102 extending on the other side of their pivots 101. These arms 102 are furnished with inwardly extending rods. The rods from one of them are designated in Fig. 1 by the reference numeral 103 and are disposed on either side of a rod 104 extending from the other arm 102. A coiled spring 105 engages at one of its ends with a cross-member 106 connecting the free extremities of the rods 103, and at its other end with a cross-piece 107 on the free extremity of the rod 104. The action of the spring 105 always tends to draw the arms 102 toward one another and in consequence to move the brake-shoes outwardly toward the gear-members 24. A suitable stop, not shown, may be provided, for example on the rod 104, to limit the movement of the brake-shoes in this direction, but the relative positions of the brake-shoes in relation to the shafts 20 are so adjusted that, when the latter are moved inwardly in the manner in which they would be moved for effecting the driving connection between their gear-members and a gear-member on the driving-shaft, the gear-members 24 are moved into engagement with the brake-shoes 100 and pressed against them in opposition to the pressure of the spring 105.

To recapitulate briefly, the action of the gear hereinbefore described is as follows:—

For the purpose of de-clutching, the shafts 20 are swung outwardly about their rear ends by means of the bearings 25 under the action of a pull on the rods 61 operating on the toggle-mechanisms 40, 44. In this position the gear-members 22, 23 or 24 may be brought selectively into a position of driving relationship with the gear-members 13, 14 and 15 for forward drive, or into a position of working relationship with the gear-members 92 for reverse drive, or into a position of working relationship with the brake-shoes 100. In whatever selected position the gear-members on the driven-shafts may have been moved to, the shafts 20 are returned and pressed toward one another and toward the driving-shaft 12 by the pressure of the spring 82 operating through the yoke 50, rods 43 and arms 42 of the toggle-levers 40.

During the time that either forward or rearward driving-connection is established between the driving- and driven-shafts, differential operation of the driving forces communicated to the driven road-wheels is obtained by the described connection of the steering mechanism with the yoke 50 which moves the latter in a direction transverse to the line of action of its thrusts imparted through the rods 43 to the toggle-mechanisms. This transverse movement modifies the relative values of the thrusts imparted to the driven-shafts so that either one of them may, at will, be thrust with greater force than its companion toward the driven-shaft.

It will be obvious that many modifications may be made in the details of construction. For example, the yoke may be constituted by a straight bar slidingly mounted in a floating and swiveling carrier, which carrier is provided with a gear-wheel meshing with a rack on the bar and has operative connection with the means for applying thrust to the bar.

Moreover, instead of moving the yoke 50 in relation to the roller 71, the cylindrical casing 80 and the arm 70 could be so mounted for transverse swinging movement that the roller 71 could be moved along the length of the yoke in the direction in which it extends transversely across the chassis. Alternatively, instead of swiveling the cylindrical case to permit transverse swinging movement, the casing and its parts and the arm 70 and its parts can be together moved bodily in the transverse direction of the chassis.

The connection between the yoke and the steering-gear includes a connection to any member forming either part of or actually controlling the steering.

It will be appreciated that the mechanism such as has been hereinbefore described, may be used for steering in such instances as when the two shafts are connected to separate propellers of a boat or to the separate endless portable tracks of a tractor or other self-propelled machine; the shafts need not necessarily rotate in the same direction as this would depend upon the manner of use and the apparatus to which the mechanism is applied.

Obviously, the controlling movements of the yoke may be very small, as it is only necessary to have sufficient play to allow the thrust applied thereto to be transmitted to the driving shaft and for the parts to adjust themselves according to the distribution of pressures under any given circumstances.

It will be appreciated, moreover, that this invention may be applied to any type of friction driving gears whether the drive be taken or transmitted through the face of a disk or through friction-clutches or through the periphery of a wheel as in the embodiment described. In the former case, for example, there need be only one driving disk or wheel for ahead running and another for reverse and two driven friction wheels or disks. The latter would be moved to various positions of adjustment along a diameter of the former for obtainment of various running speeds.

What I claim as my invention and desire to secure by Letters Patent is:—

1. In power-transmission gear of the friction type, the combination with a driving shaft, and two laterally movable driven shafts mounted each to be brought into and out of frictional driving engagement therewith, of a yoke, means for imparting pressure to the yoke, means operatively connecting the two opposite ends of the yoke each to one of the two driven shafts to thrust the same toward the driving shaft when pressure is applied to the yoke, and means for modifying the relative values of the thrusts imparted to the two driven shafts.

2. In power-transmission gear of the friction type, the combination with a driving shaft, and two laterally movable driven shafts mounted each to be brought into and out of frictional driving engagement therewith, of a yoke, means for imparting pressure to the yoke at various points of application in relation to its ends, and means operatively connecting the two opposite ends of the yoke each to one of the two driven shafts to thrust the same toward the driving shaft when pressure is applied to the yoke.

3. In power-transmission gear of the friction type, the combination with a driving shaft, and two laterally movable driven shafts mounted each to be brought into and out of frictional driving engagement therewith, of a yoke having a slot extending lengthwise therein, pressure-applying means having an operative part movably engaging the yoke in said slot, means to move the yoke and said operative part of the pressure-applying means in relation one to the other to vary the point of application of the pressure on the yoke, and means operatively connecting the two opposite ends of the yoke each to one of the two driven shafts to thrust the same toward the driving shaft when pressure is applied to the yoke.

4. In power-transmission gear of the friction type, the combination with a driving shaft, and two laterally movable driven shafts mounted each to be brought into and out of frictional driving engagement therewith, of a yoke having a slot extending lengthwise therein, pressure-applying means having an operative part movably engaging the yoke in said slot, means to move the yoke in relation to said operative part of the pressure-applying means to vary the point of application of the pressure on the yoke, and means operatively connecting the two opposite ends of the yoke each to one of the two driven shafts to thrust the same toward the driving shaft when pressure is applied to the yoke.

5. In power-transmission gear of the friction type, the combination with a driving shaft, and two laterally movable driven shafts mounted each to be brought into and out of frictional driving engagement therewith, of a yoke, means for imparting a variable pressure to the yoke at various points of application in relation to its ends, and means operatively connecting the two opposite ends of the yoke each to one of the two driven shafts to thrust the same toward the driving shaft when pressure is applied to the yoke.

6. In power-transmission gear of the friction type, the combination with a driving shaft, and two laterally movable driven shafts mounted each to be brought into and out of frictional driving engagement therewith, of a yoke, means comprising mechanism having a variable ratio of transmission for imparting a variable pressure to the yoke at various points of application in relation to its ends, and means operatively connecting the two opposite ends of the yoke each to one of the two driven shafts to thrust the same toward the driving shaft when pressure is applied to the yoke.

7. In power-transmission gear of the friction type, the combination with a driving shaft, and two laterally movable driven shafts mounted each to be brought into and out of frictional driving engagement therewith, of a yoke, a pivoted lever mounted to bear against the yoke, an adjustable pressure-applying device arranged to bear on said lever at various points thereon and thereby impart a variable pressure to the yoke, means for moving said yoke and said lever in relation one to the other to vary the point of application of the pressure on the yoke, and means operatively connecting the two opposite ends of the yoke each to one of the two driven shafts to thrust the same toward the driving shaft when pressure is applied to the yoke.

8. In power-transmission gear of the friction type, the combination with a driving shaft, and two laterally movable driven shafts mounted each to be brought into or out of frictional driving engagement therewith, of a yoke, means for imparting pressure to the yoke at various points of application in relation to its ends, and two toggle-linkages operatively connecting the two opposite ends of the yoke each to one of the two driven shafts to thrust the same toward the driving shaft when pressure is applied to the yoke.

9. In power-transmission gear of the friction type, the combination with a driving shaft, and two laterally movable driven shafts mounted each to be brought into and out of frictional driving engagement therewith, of a yoke, means for imparting pressure to the yoke at various points of application in relation to its ends, and two toggle-linkages operatively connecting the two opposite ends of the yoke each to one of the two driven shafts to thrust the same toward the driving shaft when pressure is applied to the yoke, one arm of each toggle-joint of each toggle-linkage extending toward the driving shaft and toward one another, for the purpose described.

10. In power-transmission gear of the friction type, the combination with a driving shaft, and two laterally movable driven shafts mounted each to be brought into and out of frictional driving engagement therewith, of a yoke having a slot extending lengthwise therein, pressure applying means having an operative part movably engaging the yoke in said slot, means to move the yoke and said operative part of the pressure applying means in relation one to the other to vary the point of application of the pressure on the yoke, and two toggle-linkages operatively connecting the two opposite ends of the yoke each to one of the two driven shafts to thrust the same toward the driving shaft when pressure is applied to the yoke, one arm of each toggle-linkage extending toward the driving shaft and toward one another, for the purpose specified.

11. In power-transmission gear of the friction type, the combination with a driving shaft, and two laterally movable driven shafts mounted each to be brought into and out of frictional driving engagement therewith, of a yoke, means comprising mechanism having a variable ratio of transmission for imparting a variable pressure to the yoke at various points of application in relation to its ends, and two toggle-linkages operatively connecting the two opposite ends of the yoke each to one of the two driven shafts to thrust the same toward the driving shaft when pressure is applied to the yoke, one arm of each toggle-joint of each toggle-linkage extending toward the driving shaft and toward one another, for the purpose specified.

12. In power-transmission gear of the friction type, the combination with a driving shaft, and two laterally movable driven shafts mounted each to be brought into and out of frictional driving engagement therewith, of a yoke having a slot extending lengthwise therein, pressure-applying means having an operative part arranged to movably engage the yoke in said slot, means to move said yoke in relation to said operative part of the pressure-applying means transversely of the line of application of the pressure to the yoke, and two rod-and-lever mechanisms, each comprising a relatively long rod connected at one end each to one end of the yoke, operatively connecting the two opposite ends of the yoke each to one of the two driven shafts to thrust the same toward the driving shaft when pressure is applied to the yoke, for the purpose specified.

13. In power-transmission gear of the friction type, the combination with a driving shaft, and two laterally movable driven shafts mounted each to be brought into and out of frictional driving engagement therewith, of a yoke having a slot extending lengthwise therein, pressure-applying means having an operative part arranged to movably engage the yoke in said slot, means to move said yoke in relation to said operative part of the pressure-applying means transversely of the line of application of the pressure to the yoke, and two rod-and-lever mechanisms operatively connecting the two opposite ends of the yoke each to one of the two driven shafts to thrust the same toward the driving shaft when pressure is applied to the yoke, each of the said mechanisms comprising a relatively long rod connected at one end to one end of the yoke, and a toggle that is connected to the other end of the said rod and to one of the driven shafts for the purpose specified.

14. In power-transmission gear of the friction type, the combination with a driving shaft, and two laterally movable driven shafts mounted each to be brought into and out of frictional driving engagement therewith, of a yoke, means for imparting pressure to the yoke at various points of application in relation to its ends, means operatively connecting the two opposite ends of the yoke each to one of the two driven shafts to thrust the same toward the driving shaft when pressure is applied to the yoke, and additional means operatively connected with the latter means for moving the driven shafts into and out of driving engagement with the driving shaft.

15. In power-transmission gear of the friction type, the combination with a driving shaft, and two laterally movable driven shafts mounted each to be brought into and out of frictional driving engagement therewith, of a yoke, means for imparting pressure to the yoke at various points of application in relation to its ends, two toggle-linkages operatively connecting the two opposite ends of the yoke each to one of the two driven shafts to thrust the same toward the driving shaft when pressure is applied to the yoke, one arm of each toggle-joint of each toggle-linkage extending toward the driving shaft and toward one another, and a manually-operable rod operatively connected to each toggle-joint and arranged to actuate the toggle-linkages and thereby move the driven shafts into and out of driving engagement with the driving shaft.

16. In power-transmission gear of the friction type, the combination with a driving shaft, and two laterally movable driven shafts mounted each to be brought into and out of frictional driving engagement therewith, of a yoke, a pivoted lever mounted to bear against the yoke, a pressure-applying device comprising a cylindrical casing pivotally mounted at one end, a spring-controlled piston-like member movable in said casing and having a rod extending through the other end thereof and arranged to bear on and move along said lever and thereby impart a variable pressure to the yoke, means for moving said yoke and said lever in relation one to the other to vary the point of application of the pressure on the yoke, and means operatively connecting the two opposite ends of the yoke each to one of the two driven shafts to thrust the same toward the driving shaft when pressure is applied through said lever to the yoke.

17. In a power-driven vehicle or boat, the combination with the steering-gear of the vehicle or boat, and friction-drive power-transmission gear comprising a driving shaft, two laterally movable driven shafts mounted each to be brought into and out of frictional driving engagement with the latter, a yoke, pressure-applying means for imparting pressure to the yoke at various points in relation to its ends, and means operatively connecting the two opposite ends of the yoke each to one of the two driven shafts to thrust the same toward the driving shaft when pressure is applied to the yoke, of means operatively connecting the said steering-gear with said power-transmission gear and arranged to change the point of application of the pressure to the yoke when the steering-gear is moved.

18. In a power-driven vehicle or boat, the combination with the steering-gear of the vehicle or boat, and friction-drive power-transmission gear comprising a driving shaft, two laterally movable driven shafts mounted each to be brought into and out of frictional driving engagement with the latter, a yoke, pressure-applying means for imparting pressure to the yoke at various points of application in relation to its ends, and means operatively connecting the two opposite ends of the yoke each to one of the two driven shafts to thrust the same toward the driving shaft when pressure is applied to the yoke, of means operatively connecting the steering-gear with said yoke for changing the point of application of the pressure on the yoke when the steering-gear is moved.

19. In friction-drive power-transmission gear, the combination with a driving shaft carrying a driving friction gear-member, two driven shafts each carrying friction driven gear-members movable along the same into and out of free-engine position and positional working relation with the driving gear-member, two brake-members arranged each in positional working relation with one of said driven gear-members when in their free-engine position, a yoke, means for imparting pressure to the yoke at various points of application in relation to its ends, and means operatively connecting the two opposite ends of the yoke each to one of the two driven shafts to thrust the latter toward the driving shaft when pressure is applied to the yoke and thereby move one driven gear-member on each driven shaft into frictional engagement with said brake-members when the gear-members are in their free-engine position.

In testimony whereof I affix my signature.

GERALD BARKER.